May 3, 1960
H. A. THATCHER
2,934,873
APPARATUS FOR PACKING AND WRAPPING FOOD PRODUCTS
Filed Nov. 12, 1957
2 Sheets-Sheet 1
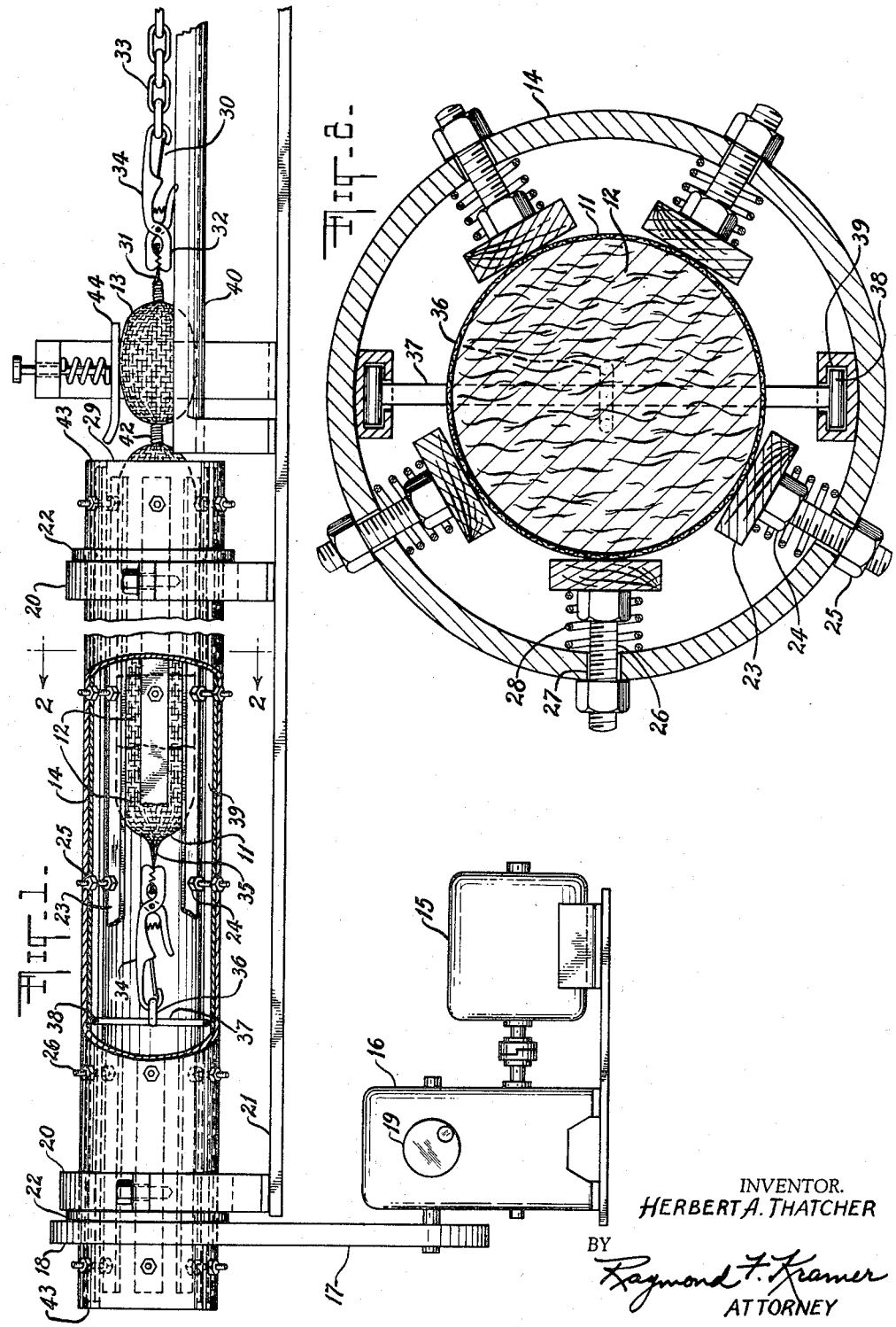
INVENTOR.
HERBERT A. THATCHER
BY
Raymond F. Kramer
ATTORNEY May 3, 1960 H. A. THATCHER 2,934,873
APPARATUS FOR PACKING AND WRAPPING FOOD PRODUCTS
Filed Nov. 12, 1957 2 Sheets-Sheet 2
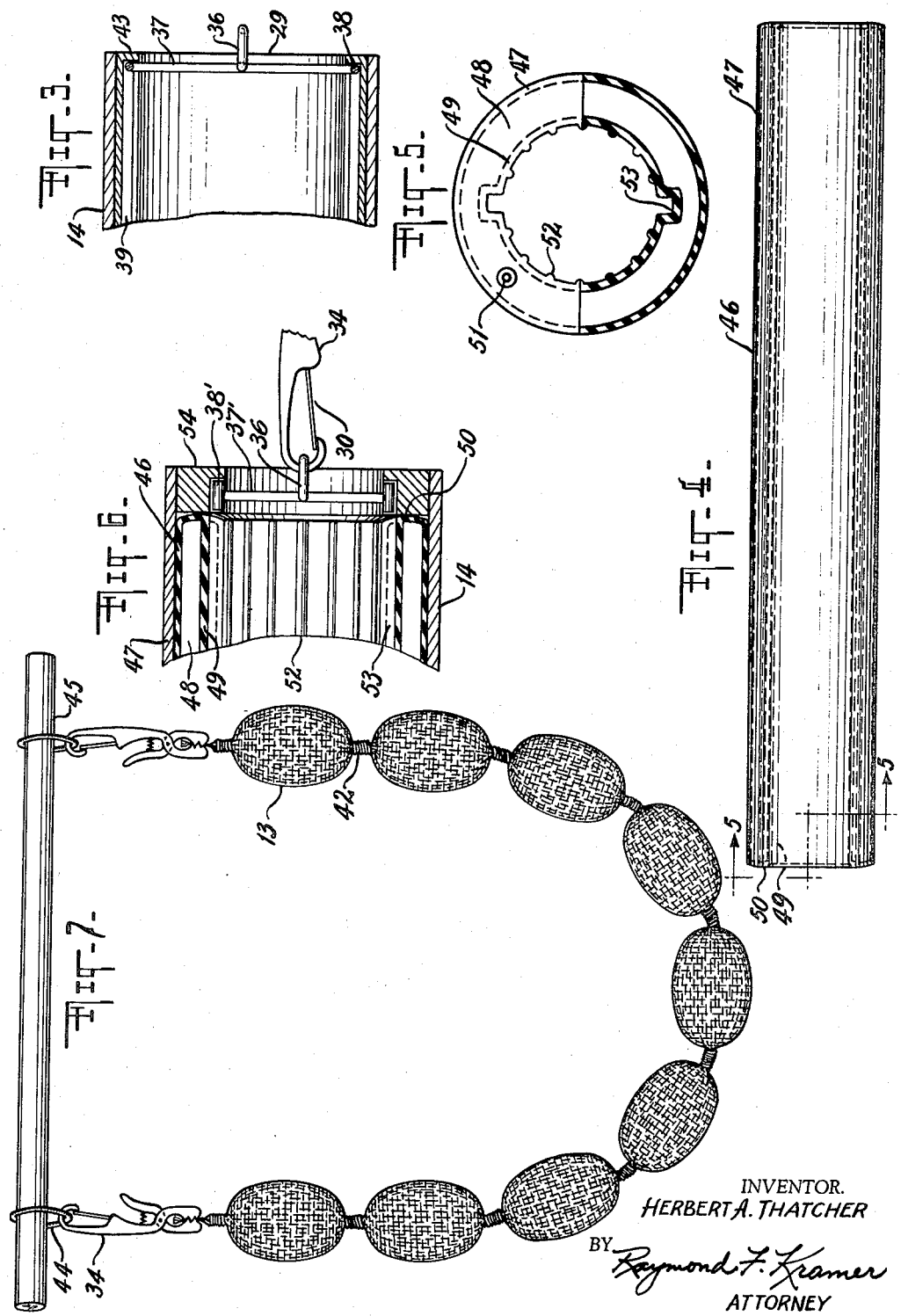
INVENTOR.
HERBERT A. THATCHER
BY Raymond F. Kramer
ATTORNEY

United States Patent Office 2,934,873
Patented May 3, 1960

---

2,934,873

APPARATUS FOR PACKING AND WRAPPING FOOD PRODUCTS

Herbert A. Thatcher, Ozone Park, N.Y.

Application November 12, 1957, Serial No. 695,635

5 Claims. (Cl. 53—370)

This invention is of an improved apparatus for packing and wrapping food products. More particularly, it relates to the packing and wrapping of individual pieces of meat product, e.g., pork butts, in tubular stockinets or casings and to treatment of the meat when so packed.

In packing food products, such individual, irregularly shaped pieces of meat, into attractive, uniformly shaped units, it has been the practice to place a piece of meat inside a flexible tube of packing material and tightly twist or otherwise fasten the ends of the tube while causing its walls to exert pressure on the contained piece of meat, thus forming it into an attractive, well-rounded product. According to a different method a number of pieces of meat is placed end to end in a stockinet and packing is effected by alternate twisting of intermediate portions of the stockinet corresponding to lengths of contained meat. In still another process a stockinet is packed or stuffed with a multiplicity of meat butts, the tube next being twisted between lengths of meat and then the continuous string of packed meat is placed inside a second, untwisted stockinet which prevents unwinding of the primary package.

The methods described above and the apparatuses for performing them result in comparatively slow and inefficient production of food products packed and/or wrapped in flexible tubes and having sealed ends. As illustrative of these comparative disadvantageous properties it may be mentioned that some of the prior art methods operate on single pieces of meat and therefore require uneconomical duplication of some process steps. Other known processes necessitate the employment of extra stockinets to prevent untwisting of the wrap during curing or storage operations. None of the prior art known to applicant discloses any machine for automatically or semi-automatically making unidirectionally twisted separately tightly packed and shaped lengths of originally individual pieces of food product.

It is an object of this invention to provide an apparatus adapted for automatic or semi-automatic operation which will quickly and efficiently make regular and attractive intermediate separating and packing twisted portions in a stockinet or tubular casing filled with individual pieces of food product. Also an object is to provide such an apparatus which can be employed interchangeably to overwrap products which were previously encased or covered with other film or knitted material. Another object is to furnish an apparatus which is capable of making end twists on tubes of food product as well as the intermediate twisted sections mentioned above. It is also an aim of this invention to make a trouble-free, uncomplicated apparatus which will hold a tube stuffed with food product in fixed rotational relationship with respect to a rotating longitudinal holding member while still allowing a controllable axial withdrawing movement of the tube of food product on application of a withdrawing force. Another aim is to provide means for holding tightly the ends of the stuffed flexible tube, which means are easily fastenable to other appropriate elements of the apparatus and suspending means.

An object of the invention is providing for quickly and economically packing, and often shaping individual food products in tubes or casings with unidirectionally twisted intermediate tube portions separating them, also making end twists in said casings. It is also a further object of the invention to provide for hermetically sealing food products whereby the food product is individually packed in a continuous connected series in permeable casing material, subjected to a cooking or curing medium, then stuffed in an impermeable flexible tube of wrapping material, either while connected, after separation or after stripping of the permeable casing, after which the impermeable tube containing product is twisted into separate packed units and the casing is shrunk to conform to the shape of the food product and to make tightly sealed the twisted ends, following which the packed products are disconnected by cutting the twists.

In accordance with the present invention a machine for packing food products comprises a rotatable longitudinal member adapted to hold a number of lengths of food product in series inside a flexible tube of packing material and having means for yieldingly holding said tube of food product so as to prevent rotational movement thereof with respect to the longitudinal member while allowing axial movement in response to a withdrawing force, means for applying a withdrawing force to the tube of food product and thereby removing it from the longitudinal member and means for holding a portion of the withdrawn tube of food product so that the longitudinal member rotates with respect to the held portion, thereby causing unidirectional twisting of the flexible tube between lengths of food product, thus separating and tightly packing individually said lengths of food product.

In much greater particularity the invention comprises a machine for packing a multiplicity of individual pieces of meat in a flexible casing with unidirectionally twisted portions of said casing separating the pieces of meat comprising a rotatable hollow tubular member adapted to contain a number of abutting lengths of meat in series inside a flexible tubular casing, means inside the tubular member for holding the casing and contained meat in fixed rotational relationship with respect to the tubular member while still allowing axial movement of the casing and contents in response to a withdrawing force, means for applying a withdrawing force to the casing and contained meat and thereby removing them from the tubular member and means for holding a portion of the withdrawn casing of meat non-rotatable while the tubular member is rotating, thereby causing unidirectional twisting of the casing between lengths of meat, thus separating and tightly packing individually said pieces of meat, a riding element adapted to be fastened to the trailing end of the flexible casing, guide means for directing the movement of the riding element through the hollow tubular member as the casing of meat is withdrawn and means located at the withdrawing end of the tubular member for holding the riding element and part of the trailing end of the flexible casing in fixed rotational relationship with respect to the tubular member, thereby causing twisting of the trailing end of the casing when the tubular member is rotating and the withdrawn casing of meat is held non-rotatable, thus tightly packing the last piece of meat in the casing and twisting the end thereof.

Also in accordance with the invention is packing individual pieces of food product, e.g., pork butts, comprising stuffing a flexible tube of packing material with a multiplicity of lengths of food product, rotating the stuffed tube by application of a rotating force while holding stationary an end portion of said tube, repeatedly unidirectionally twisting the tube between lengths of food product by removing the rotating force from stuffed tube portion corresponding to a terminal length of unpacked food product while holding said terminal length portion stationary and continuing to rotate the remainder of the tube, thereby individually packing food product in flexible tubing having twisted end portions.

Other advantages of the invention, as well as other objects thereof will be apparent from the following description taken in conjunction with the accompanying drawing in which:

Fig. 1 is a partially cutaway sectioned shortened elevation of an embodiment of the apparatus of this invention containing a stockinet stuffed with pork butts and illustrating the twisting of the stockinet and packing of a pork butt;

Fig. 2 is a vertical section view of the device of Fig. 1 taken along plane 2—2 and omitting, for the sake of clarity, the showing of a special tool for fastening stockinet to rider;

Fig. 3 is an elevation of a section of the "withdrawing" end of the device of Fig. 1 showing rider and eye affixed thereto at said withdrawing end;

Fig. 4 is an elevation of an inflatable tubular means for yieldingly holding the stockinet or casing of Fig. 1 filled with abutting pieces of food product;

Fig. 5 is a partial vertical section-elevation of the device of Fig. 4 taken along planes 5—5;

Fig. 6 is a sectional elevation of the inflatable tube of Figs. 4 and 5 inside a rotatable tubular member and showing rider, means for holding the rider in fixed relationship with the tubular member when twisting the trailing end of a stockinet or casing, eye and snap or spring fastener;

Fig. 7 is an elevation of a string of individually packed pork butts held by special fastening tools at the ends thereof and suspended from rings slipped over a conventional smokestick in position for smoking.

Referring now in detail to the drawing, particularly Fig. 1, the numeral 11 represents a flexible stockinet of knitted material, casing of suitable film plastic such as polyvinyl chloride, polyvinylidene chloride, polyethylene or rubber hydrochloride or other flexible tubular packing or wrapping material. Inside the stockinet is shown a series of abutting lengths of meat product, 12, e.g., pork butts, or other individual food product. The stockinet of pork butts is, with the exception of one packed butt 13, shown interiorly of rotatable tubular member 14, sometimes referred to more generally as longitudinal member 14. Longitudinal member 14 is driven by motor 15 through speed reducer 16, belt 17 and pulley 18. The speed of rotation of longitudinal member 14 is controllable by handwheel 19 of speed reducer 16. The rotation of the longitudinal member may be started or stopped by a conventional switch (not shown). Member 14 is suspended in bearings 20 which are mounted on support 21. Thrust collars 22 prevent axial movement of member 14.

A series of strips of flexible material, in the drawing shown as wood strips 23 is held distributed about the internal circumference of member 14 and parallel to the axis thereof by nuts 24 and 25 and bolts 26 which pass through openings 27 in member 14. Springs 28 press strips 23 against stuffed tube or stockinet 11. Due to the slight irregularities in the surface of the wood strips, the frictional resistance to movement resulting therefrom, the irregularities in the stuffed tube and the skid-like action of the longitudinal strips 23 these spring-loaded strips prevent rotation of the stuffed stockinet relative thereto but still allow axial movement toward the withdrawing end 29 of tube 14. A special spring-loaded pliers-like tool having integral spring fastener portion 30 serves to connect leading end 31 of stockinet 11, clamped by jaws 32 to force-transmitting means 33 joined to any conventional device for exerting a withdrawing force, said device being unillustrated. The withdrawing means is easily controlled as to speed of withdrawal, stopping and starting, by conventional means, not shown. The special spring-loaded tool 34 referred to above is also utilized to hold trailing end 35 of stockinet 11 to eye 36 in rider 37. Rider 37 has a transversely extending end portion 38 which rides in track or guide means 39.

At the withdrawing end of the tubular member 14, fastened to support 22 and independent of member 14 is located a trough-like unit 40 for the support of withdrawn portions of stuffed stockinet 11. Above trough 40 is a spring-loaded pressure plate 41 which cooperates with trough 40 to maintain portions of stuffed casing stationary. Thus, it is clearly seen that as portions of stuffed stockinet are withdrawn from longitudinal member 14 and held stationary while member 14 and stuffed stockinet 11 containing unpacked butts 12 continue to rotate, there will be produced a twist 42 in the stockinet between terminal length of pork butt 13 and the remainder of encased butts 12. The force of twisting draws the stockinet tightly about the pork butt 13 and shapes it attractively.

By repeatedly withdrawing stuffed casing or stockinet and holding terminal butts stationary there is made a series of packed meat pieces in rounded form composing a continuous string of such product. The leading end 31 of the stockinet was easily twisted before all other portions by rotating member 14 before withdrawing any meat therefrom. The resistance to turning of force-transmitting means 33 causes the twist of the leading end of the stockinet. In order to assure the twisting of the trailing end of the stockinet however, special provision must be made. Rider 37 and track 39 have already been described. The rider and track are made of material capable of withstanding rather severe twisting force and they are of sturdy construction. Track 39 contains end stops 43 to prevent rider 37 from leaving member 14. These end stops may be constructed integral with track 39 or they may be made easily removable to facilitate removal of interior equipment for cleaning. When the last piece of meat is withdrawn from the longitudinal member 14 rider 37 in track 39 continues to rotate causing the production of a twist at the trailing end of the stockinet. After completion of the packing of a string of food product spring fastener 30 is opened and the connected series of packed product is disconnected from force-transmitting means 33 and eye 36 after which they may be subjected to any desired treatment. They may be hung suspended from the conventional smokestick as illustrated by Fig. 7. Rings 44 are used because they are easily removable from smokestick 45 and allow easy cleaning in the conventional manner.

Figs. 4–6 illustrate an alter device for holding a tube or casing stuffed with food product and keeping it non-rotatable with respect to rotating member 14. Elastomeric or flexible cylindrical yielding holding means 46, hereafter called tube 46, comprises an outer cylindrical surface 47, an inner cylindrical surface 49 and end walls 50 surrounding air space 48. Tube 46 can be expanded by air inflation of the tube through one-way valve 51. Such inflation is usually effected after placing tube 46 containing a stuffed stockinet inside member 14. The pressure of expansion ordinarily suffices to hold the tube 46 tightly enough against member 14 so that there will be no rotation relative thereto. Such pressure, and the presence of friction beads or equivalents 52 usually distributed around the tube 46 interior and positioned longitudinally, prevent rotational movement while allowing axial motion in response to a withdrawing force.

The function of the preceding embodiment of the invention is essentially the same as that of the earlier described device with several changes necessitated by the different structure. The tube 46 contains its own built in or molded track 53 to guide the rider 37'. The end portion of said rider 38', is slightly different from that of the earlier device. Because the track must withstand considerable turning moment a terminal track and stop unit is provided to allow twisting of the trailing end of stockinet. This unit 54 may be of one or more pieces and may be removable from the member 14.

In operation the air inlet 51 allows one to add just the right amount of air to prevent rotation of the pork butts but not to prevent axial movement thereof. In another embodiment of the invention a flexible swivel air line connection is made between a source of air pressure, not shown, to allow automatic decrease in pressure when stuffed stockinet is being withdrawn and increased when not in motion, thus holding and releasing the stockinet as desired and not requiring accurate adjustment of tube 46 air pressure.

In operation the device of this invention is easy to use and trouble-free. Initially the pork butts or other food product are placed inside stockinet 11, the trailing end of the stockinet is grasped between the jaws of tool 34 and the spring fastener 30 of that tool is snapped through rider eye 36. The unit is then pushed into tubular member 14 or is pulled into place by means of a cord (not shown) which may be attached to the rider 37 and can pass through the "trailing end" of member 14. After the stuffed stockinet has been inserted the leading end of the stockinet is held by jaws of another tool 34 and the spring fastener portion 30 of that tool is snapped onto force-transmitting means 33. The motor 15 is turned on and the speed reducer 16 adjusted to operating velocity of tube 14. The member 14 and contained stuffed stockinet 11 are allowed to rotate until a sufficient end twist is completed and then the stuffed tube 11 is withdrawn until a terminal length of pork butt is held against rotation by trough 40 and pressure plate 41. The rotation of member 14 can be halted while this axial movement is taking place but this is neither necessary nor is it usually desirable. The terminal butt is held in the position described above until a sufficient intermediate twist has been completed and then the axial movement is repeated. This process continues until all but the last or trailing end twist have been made. The final withdrawing movement causes the last butt to be held stationary between trough 40 and plate 41 and at the same time rider 37, held in fixed rotational relationship with track guide means 39, continues to rotate, forming an end twist on the trailing end of the stockinet and thereby completely and individually packing the series of meat product.

The above description of the packing or wrapping of a series of pork butts was made with particular to one type of device for preventing relative rotational movement of stuffed stockinet with respect to member 14. In a similar manner the device of Figs. 4-6 may be utilized.

After packing in the knitted stockinet or permeable plastic film the pork butts may be subjected to the usual smoking operation. This is easily done by removing the butts in a continuous string, keeping the special tools 34 attached at the ends thereof and hanging the loop of butts from a smokestick in the manner illustrated.

To one of skill in the packing and wrapping arts it will be evident that the disclosed apparatus has application to processing many different kinds of food products, not only pork butts and similar types of individually sold meat products, but a wide variety of foods such as cheeses, solid fruits and vegetables, baked goods and so forth, so long as the items to be packed or wrapped possess sufficient resistance to crushing and do not fuse during the processing. The packing need not be an operation in which the packed product is subjected to considerable pressure and is reshaped in the process; by careful selection of the wrapping medium and keeping twists to a minimum the packing pressure can be kept low and the process can be used to wrap fragile items.

The apparatus can be used to cover or overwrap products previously packed or wrapped. In each such use the invented apparatus is first utilized to pack food product, e.g., pork butts, in a permeable casing of plastic film such as polyvinyl chloride or polyethylene and the packed string of meat is smoked in the usual manner at about 180° F. The permeable casing ends may then be trimmed, or alternatively the whole string may be left intact, and stuffed into a relatively impermeable plastic film casing of the same type or different material, preferably one capable of shrinking. The wrapping process is repeated and the wrapped string of butts is plunged into a water bath near boiling temperature, causing shrinkage of the wrap, which may be Saran, Cryovac, polyethylene or rubber hydrochloride or other plastic of similar properties. In shrinking the twists are tightened and made permanent so that on cutting the twists to separate pieces of food an air-tight seal results.

Usually tubular, preferably cylindrical stockinets or plastic, cellulosic or cellophane packing or wrapping is used; in some instances it is possible to use sheets of those materials shaped into seamed but unsealed casings.

Trough 40 and plate 41 cooperate to hold the withdrawn piece of food product stationary and this type of construction is preferred. However, it is not really necessary that such elements be part of the apparatus since the resistance to turning of the withdrawn string of butts would cause the production of twists when member 14 turns. With such an apparatus it is desirable to retain the trough feature to prevent excess motion of the withdrawn product, and it is also recommended to hold the speed of rotation of the stuffed casing to a minimum.

In the drawings and description the apparatus is shown in a horizontal position but clearly this may be changed to vertical without decreasing the utility of the invention.

The invented machine may be completely automatic from start-up to shut-off, especially if a very uniform food product is being wrapped or packed. The withdrawal of food product may be continuous or intermittent and the rotation of the longitudinal member may be similarly regulated. With the processing of less regular food product or where the expense of complete automation is not warranted it is often preferred to allow the longitudinal member to rotate continuously while manually regulating the withdrawing speed to make the required twists between units of food product.

The longitudinal member 14 may be of any suitable length, considering the purpose for which it is being employed; usually the tube must be long enough to contain at least five units of food product in order to benefit from the apparatus' designed economy of operation.

Other equivalent elements may be substituted for components such as the guide means, yieldingly holding means for preventing rotation of the stuffed stockinet relative to the rotating member, mounting means for operatively connecting the yieldingly holding means to the longitudinal member, grasping jaws, spring fastener, and so forth.

The invention has been described with particular references to preferred embodiments thereof as well as permissive alternatives. It is obvious to one skilled in the art that modifications of the devices shown and discussed may be made and equivalents may be substituted for elements of the described apparatus and process without our departure from the spirit of the invention or passing beyond the purview of the claims.

What is claimed is:

1. A machine for packing food products comprising a rotatable longitudinal member adapted to hold a plurality of separate lengths of food product in series inside a flexible tube of packing material and having means for yieldingly holding said tube of food product so as to prevent rotational movement thereof with respect to the longitudinal member while allowing axial movement in response to a withdrawing force, means for applying a withdrawing force to the tube of food product and thereby removing it from the longitudinal member and means for holding a portion of the withdrawn tube of food product so that the longitudinal member rotates with respect to the held portion, thereby causing unidirectional twisting of the flexible tube between successive lengths of food product, thus separating and tightly packing individually said lengths of food product whereby the wound strings of separately packed individual lengths of food product may be suspended from their ends without unwinding.

2. A machine for packing a multiplicity of individual pieces of meat in a flexible casing with unidirectonally twisted portions of said casing separating the pieces of meat comprising a rotatable hollow tubular member adapted to contain a number of abutting lengths of meat in series inside a flexible tubular casing, means inside the tubular member for holding the casing and contained meat in fixed rotational relationship with respect to the tubular member while still allowing axial movement of the casing and contents in response to a withdrawing force, means for applying a withdrawing force to the casing and contained meat and thereby removing them from the tubular member and means for holding a portion of the withdrawn casing of meat non-rotatable while the tubular member is rotating, thereby causing unidirectional twisting of the casing between lengths of meat, thus separating and tightly packing individually the pieces of meat.

3. A machine for packing a multiplicity of pork butts in a flexible casing so that unidirectionally twisted portions of said casing separate the pork butts, comprising a rotatable hollow tubular member adapted to contain a number of abutting butts in series inside a flexible tubular casing, a multiplicity of strips of flexible material inside the tubular member parallel to the axis and distributed about the internal circumference thereof and operatively connected therewith and adapted to contact and press upon the casing of butts and so hold the casing and contained meat in fixed rotational relationship with respect to the tubular member while still allowing axial movement of the casing and contained butts on application of a withdrawing force, means for applying a withdrawing force to the casing of butts and thereby removing it from the tubular member and means for holding a part of the withdrawn portion of encased butts non-rotatable while the tubular member is rotating, thereby causing unidirectional twisting of the casing between butts, thus separating and packing said butts individually.

4. A machine for packing a multiplicity of pork butts in a flexible casing so that unidirectionally twisted portions of said casing separate the pork butts comprising a rotatable hollow tubular member adapted to contain a number of abutting butts in series inside a flexible tubular casing, an expansible, inflatable liner for the tubular member adapted, when inflated, to contact and press upon the casing of butts and so hold the casing and contained butts in fixed rotational relationship with respect to the tubular member while still allowing axial movement of the casing and contained butts on application of a withdrawing force, means for applying a withdrawing force to the casing of butts and thereby removing it from the tubular member and means for holding a part of the withdrawn portion of encased butts non-rotatable while the tubular member is rotating, thereby causing unidirectional twisting of the casing between butts, thus separating and packing the butts individually.

5. A machine for packing a multiplicity of individual pieces of meat in a flexible casing with unidirectonally twisted portions of said casings separating the pieces of meat comprising a rotatable hollow tubular member adapted to contain a number of abutting lengths of meat in series inside a flexible tubular casing, means inside the tubular member for holding the casing and contained meat in fixed rotational relationship with respect to the tubular member while still allowing axial movement of the casing and contents in response to a withdrawing force, means for applying a withdrawing force to the casing and contained meat and thereby removing them from the tubular member and means for holding a portion of the withdrawn casing of meat non-rotatable while the tubular member is rotating, thereby causing unidirectional twisting of the casing between lengths of meat, thus separating and tightly packing individually said pieces of meat, a riding element adapted to be fastened to the trailing end of the flexible casing, guide means for directing the movement of the riding element through the hollow tubular member as the casing of butts is withdrawn and means located at the withdrawing end of the tubular member for holding the riding element and part of the trailing end of the flexible casing in fixed rotational relationship with respect to the tubular member, thereby causing twisting of the trailing end of the casing when the tubular member is rotating and the withdrawn casing of meat is held non-rotatable, thus tightly packing the last piece of meat in the casing and twisting the end thereof.

References Cited in the file of this patent

UNITED STATES PATENTS

| | | |
|---|---|---|
| 997,667 | Grover | July 11, 1911 |
| 1,059,664 | Evans | Apr. 22, 1913 |
| 2,107,166 | Rumsey | Feb. 1, 1938 |
| 2,247,312 | Rumsey | June 24, 1941 |
| 2,598,073 | Rumsey | May 27, 1952 |

FOREIGN PATENTS

| | | |
|---|---|---|
| 24,247 | Great Britain | Sept. 3, 1914 |